Feb. 17, 1948.    D. E. SUNSTEIN    2,436,235
RECORDING APPARATUS
Filed May 5, 1944    5 Sheets-Sheet 1
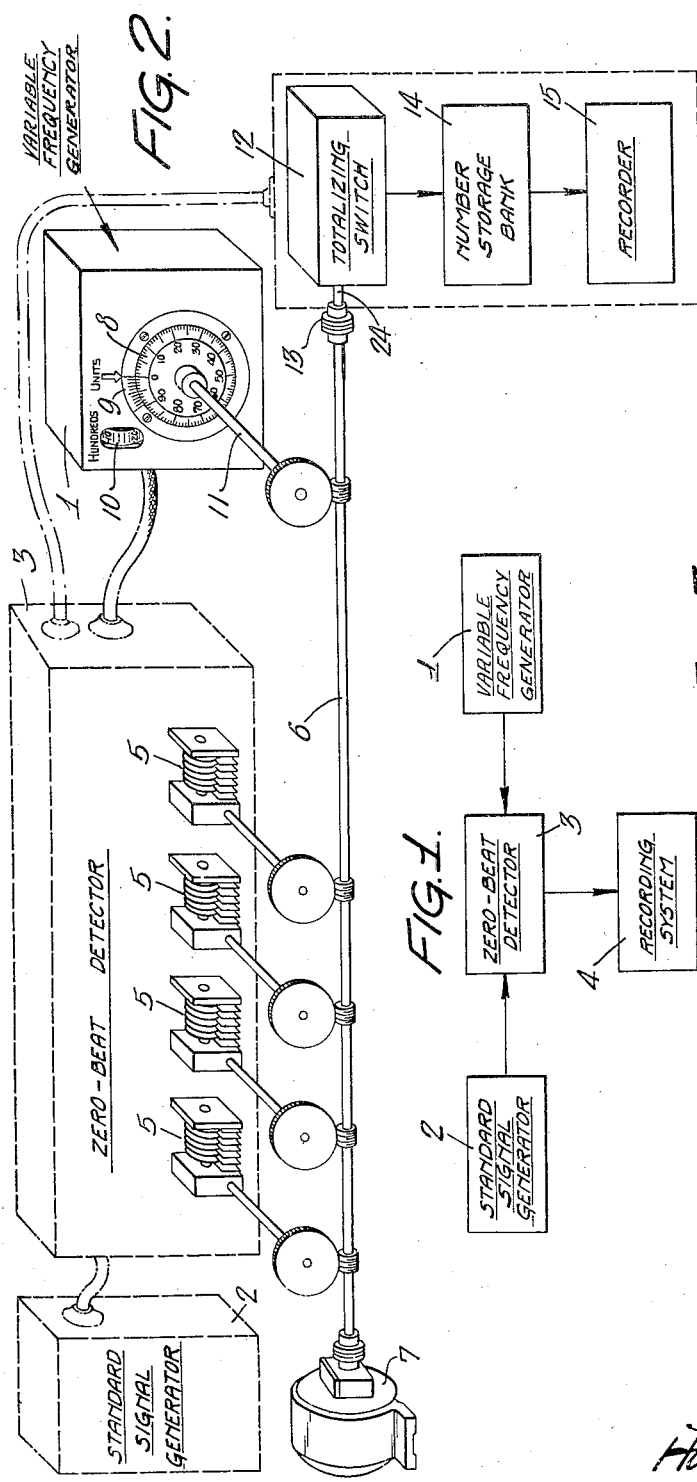
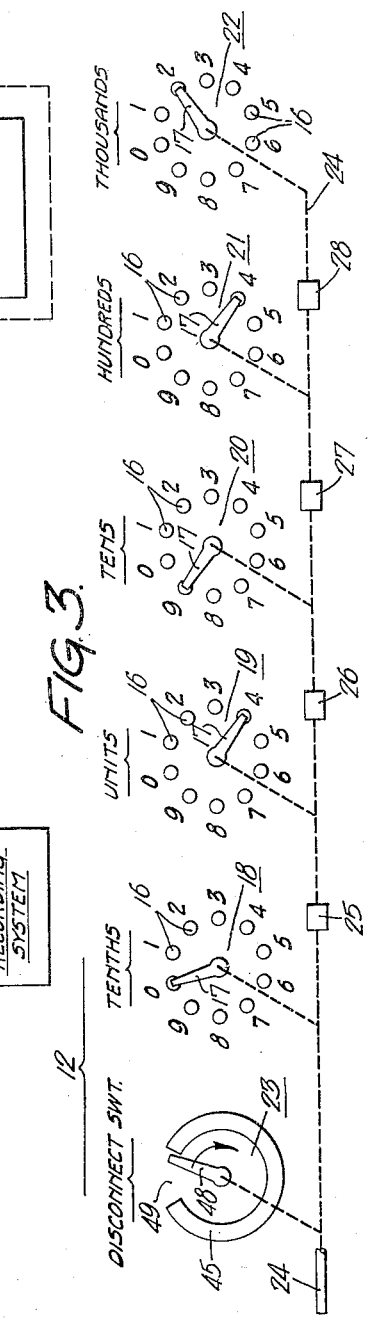
Inventor:
David E. Sunstein
by his Attorneys
Howson & Howson Feb. 17, 1948. D. E. SUNSTEIN 2,436,235
RECORDING APPARATUS
Filed May 5, 1944 5 Sheets-Sheet 2
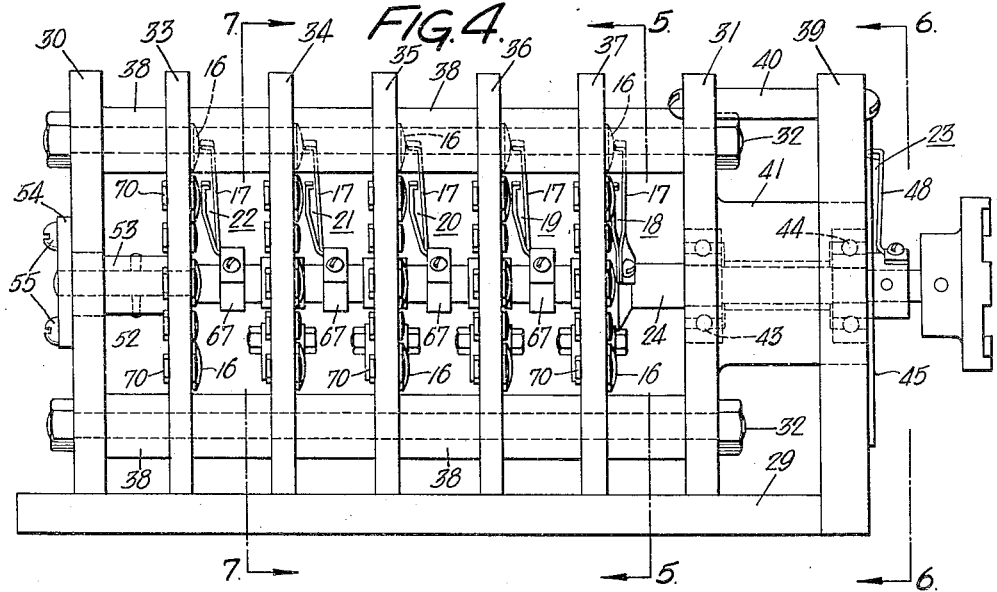
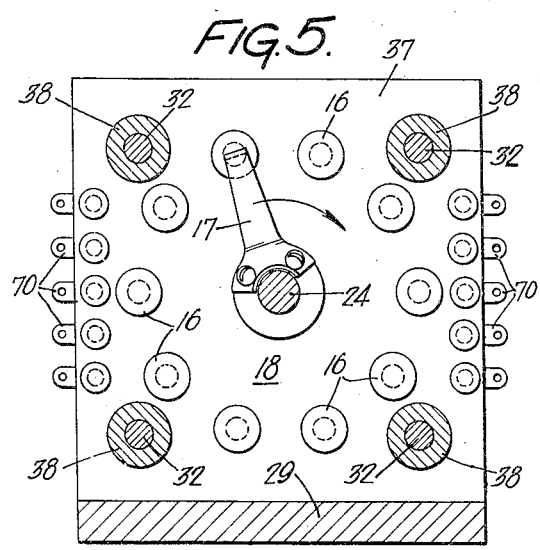
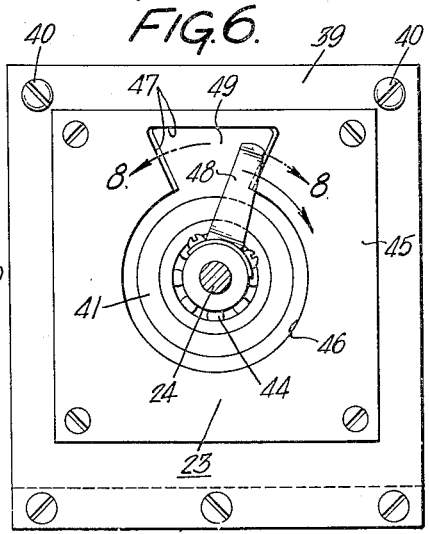
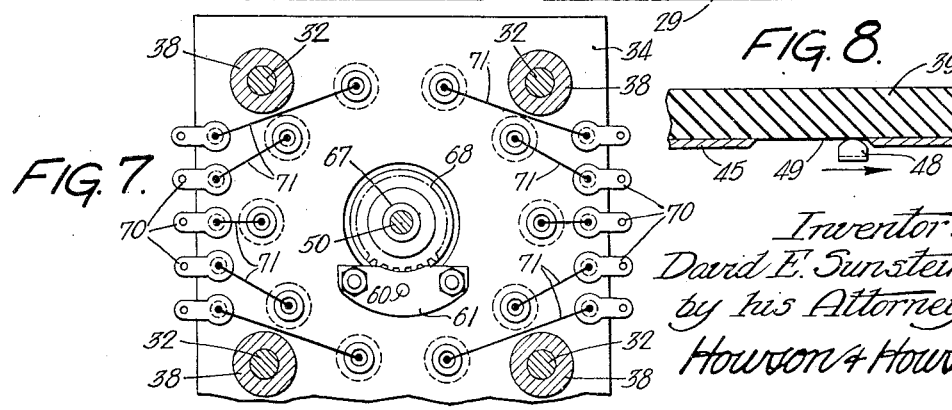
Inventor:
David E. Sunstein
by his Attorneys
Howson & Howson Feb. 17, 1948. D. E. SUNSTEIN 2,436,235
RECORDING APPARATUS
Filed May 5, 1944 5 Sheets-Sheet 3
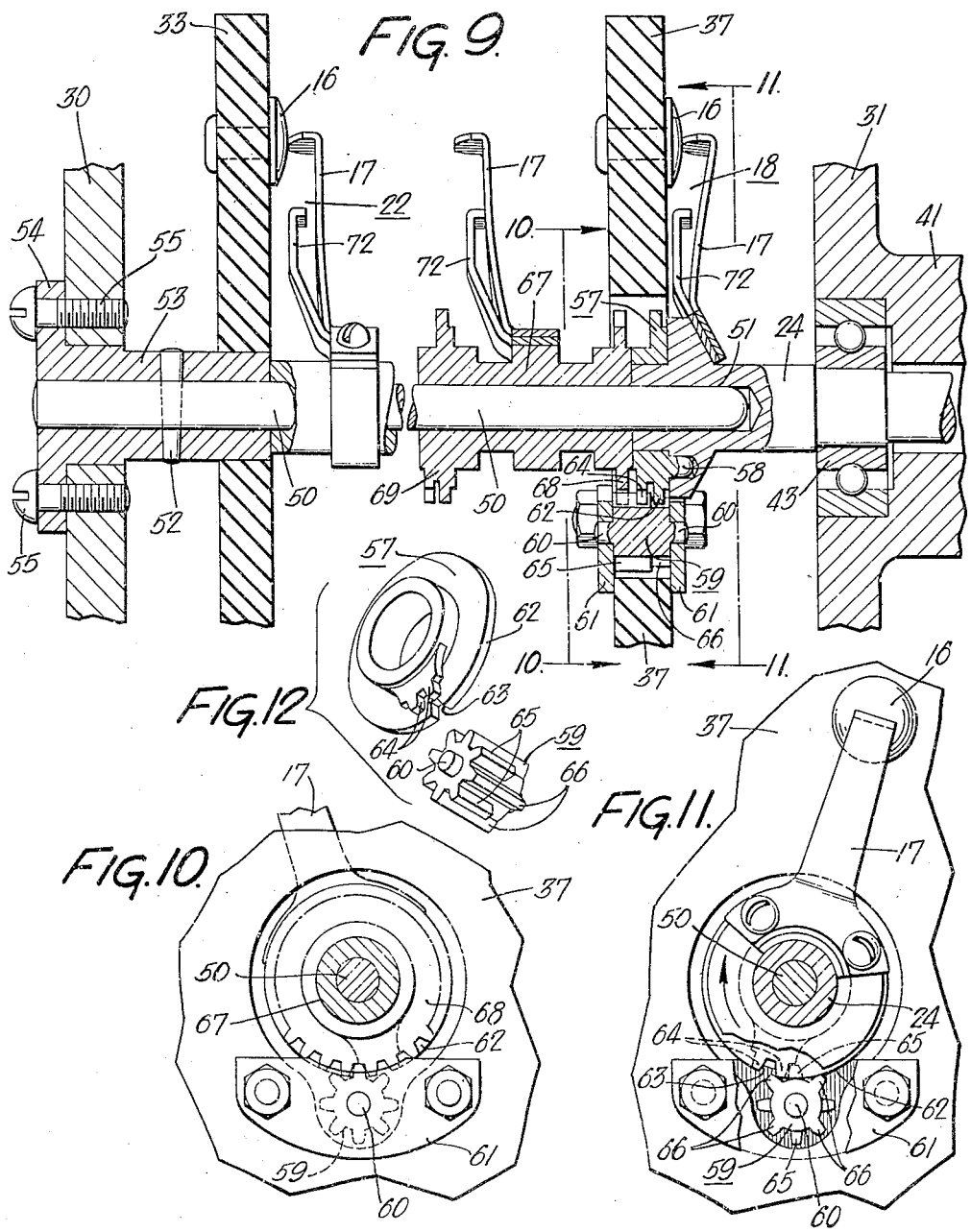
Inventor:
David E. Sunstein
by his Attorneys
Howson & Howson Feb. 17, 1948. D. E. SUNSTEIN 2,436,235
RECORDING APPARATUS
Filed May 5, 1944 5 Sheets-Sheet 4

Inventor:
David E. Sunstein
by his Attorneys
Howson & Howson

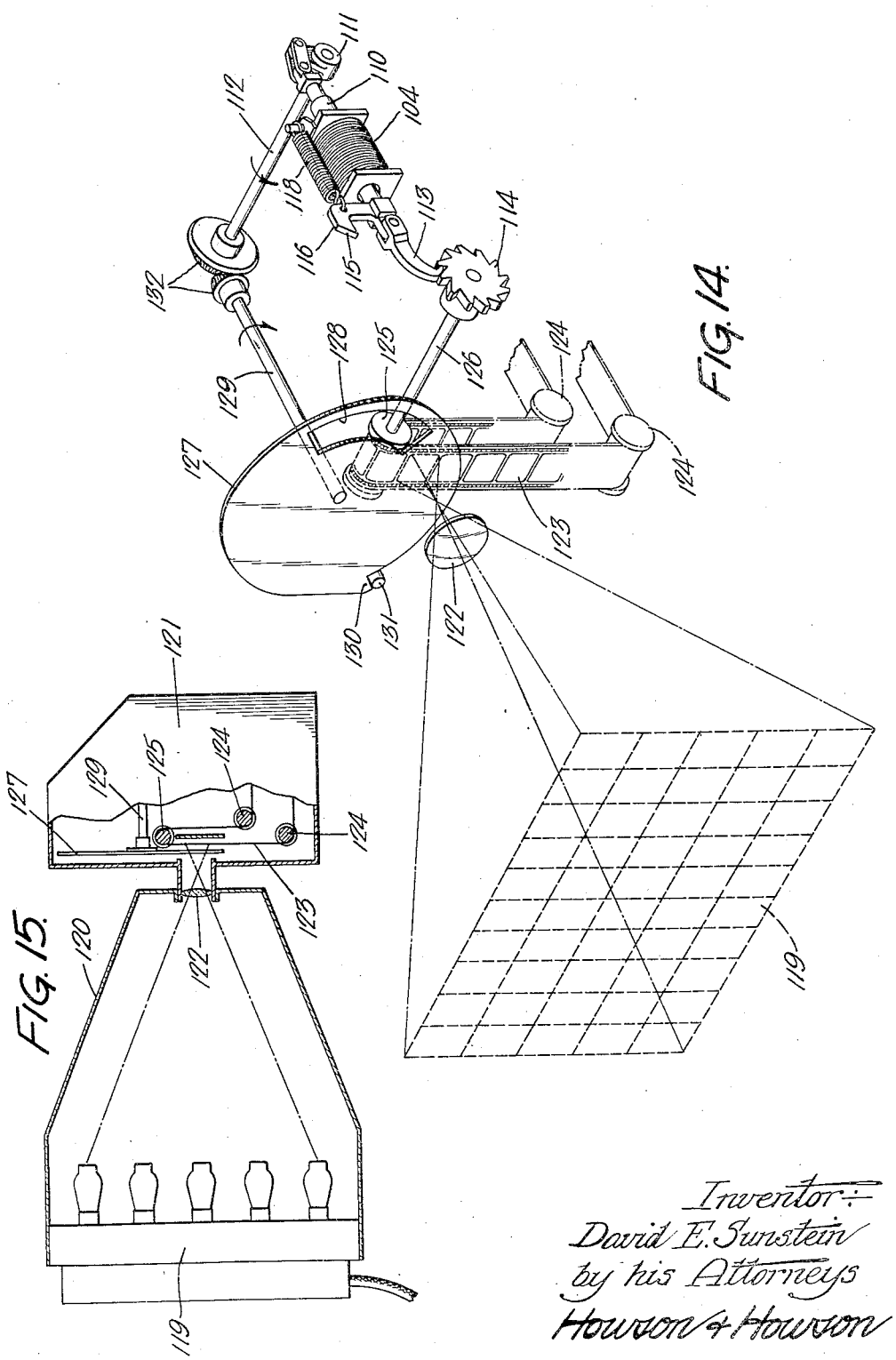

Patented Feb. 17, 1948

2,436,235

UNITED STATES PATENT OFFICE 2,436,235

RECORDING APPARATUS

David E. Sunstein, Elkins Park, Pa., assignor to Philco Corporation, Philadelphia, Pa., a corporation of Pennsylvania Application May 5, 1944, Serial No. 534,384

8 Claims. (Cl. 234—1.5)

1

This invention relates to a novel apparatus for accurately recording the totalized revolutions of a rotating shaft at a given instant, and more particularly the invention relates to an apparatus of this character which is adapted for use in a system for rapidly and accurately calibrating a variable frequency generator, by comparison with a standard signal generator capable of generating a band of frequencies over which the variable frequency generator is to be calibrated.

Recent developments in the manufacture of highly precise measuring instruments have given rise to the need for a suitable means for accurately recording the totalized revolutions of a rotating shaft at a given instant, particularly where the shaft is rotating continuously at speeds of considerable magnitude. One such development, which has presented a substantial problem in this respect, relates to the rapid calibration of frequency meters of the signal generator type, each of which includes a variable frequency oscillator. A system has been developed which is adapted to calibrate such a variable frequency generator by comparison of its generated frequency with the frequency of a standard signal source, and in which the totalized revolutions of a continuously rotating shaft, at successive instants, represent positional calibrations corresponding to different frequencies of the variable frequency generator. The frequency comparison is effected by means of a "zero beat detector" which is instrumental in generating a control impulse each time the frequency of the variable frequency generator coincides with a known frequency of the standard signal source. The desired calibrations are obtained by recording the totalized revolutions of the aforementioned shaft each time a control impulse is generated by the zero beat detector. Such a system is disclosed and claimed in copending application Serial No. 570,714, filed December 30, 1944, and it will be further referred to hereinafter.

The present invention has for its principal object the provision of a simple and efficient means for accurately recording the totalized revolutions of a rotating shaft at a given instant, particularly in a system of the character above mentioned.

A more specific object of the invention is to provide a novel apparatus in which provision is made for totalizing the revolutions of a rotating shaft at any instant, and in which further provision is made for temporarily storing the number of the totalized revolutions in a "number storage bank," and for automatically recording the stored number.

2

Other objects and features of the invention will be apparent hereinafter.

In the accompanying drawings:

Fig. 1 is a simple block diagram showing the principal components or units of a calibrating system of the type above mentioned;

Fig. 2 is a further schematic illustration of such system;

Fig. 3 is a schematic illustration of a totalizing switch which is employed as a part of the present invention;

Fig. 4 is a side elevational view of the totalizing switch;

Fig. 5 is a sectional view taken along line 5—5 of Fig. 4;

Fig. 6 is a sectional view taken along line 6—6 of Fig. 4;

Fig. 7 is a sectional view taken along line 7—7 of Fig. 4;

Fig. 8 is a detail sectional view taken along line 8—8 of Fig. 6;

Fig. 9 is a fragmentary sectional view taken longitudinally of the totalizing switch showing more clearly the construction thereof;

Fig. 10 is a sectional view taken along line 10—10 of Fig. 9;

Fig. 11 is a sectional view taken along line 11—11 of Fig. 9;

Fig. 12 is a perspective view showing the principal driving elements by means of which each succeeding section of the switch is driven by the preceding section;

Fig. 14 is a perspective view showing one form of the recording apparatus and the associated driving mechanism therefor; and Fig. 15 is an illustration, partly in section and partly in side elevation, of the number storage bank unit and the associated recording apparatus.

Figure 13:
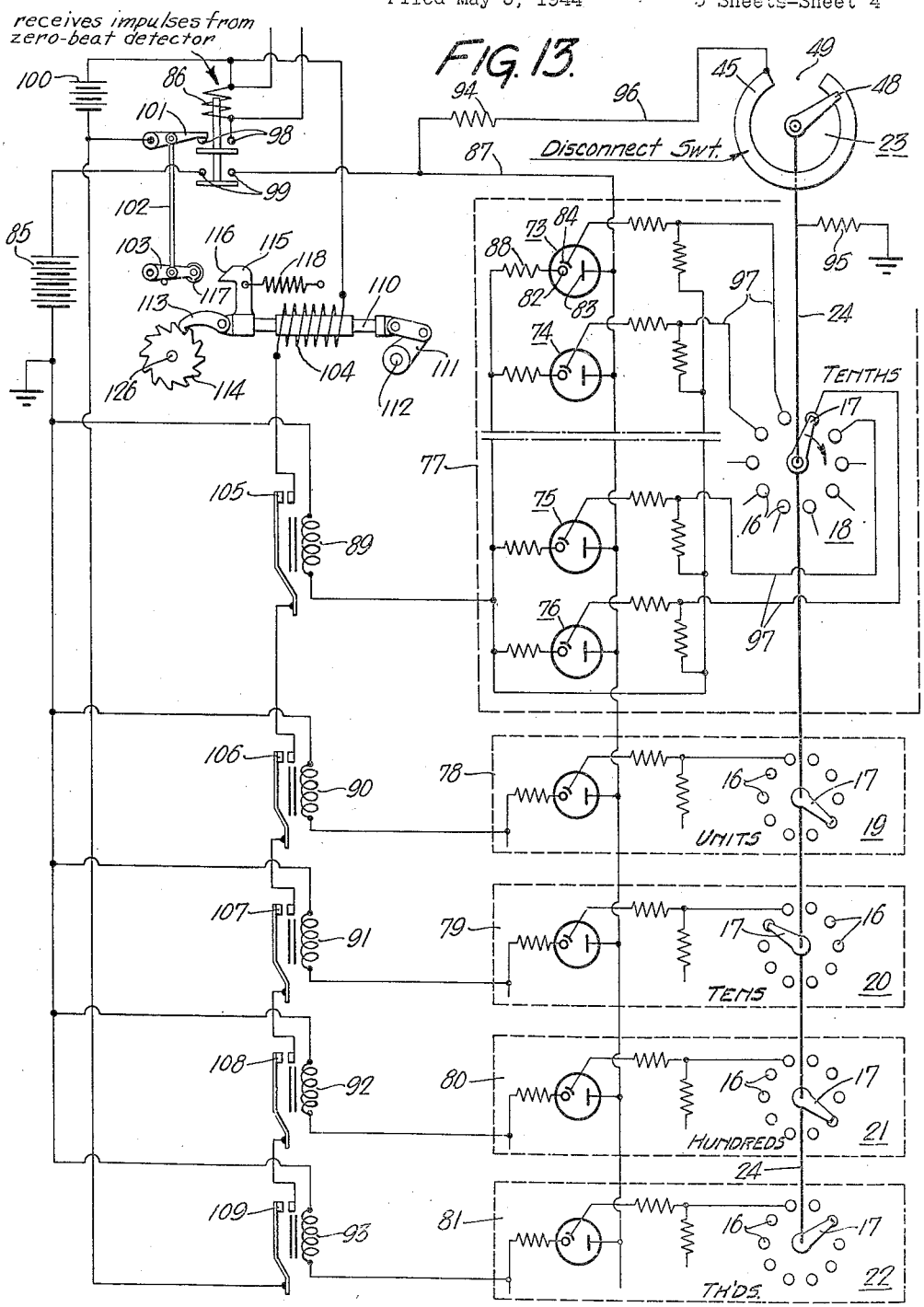
Fig. 13 is a diagrammatic illustration showing the number storage bank associated with the totalizing switch and also the mechanism for operating a recording apparatus.

As stated above, the present invention is particularly adapted for use in a calibrating system for variable frequency generators, and it will be described with specific reference thereto, although it is to be understood that the invention is applicable in any instance where it is desired to accurately record the totalized revolutions of a rotating shaft.

In Fig. 1, there is shown a simple block diagram of the principal units of the variable frequency generator calibrating system above mentioned. These units comprise the variable frequency generator 1 which is to be calibrated, a standard signal generator 2 capable of producing a band of frequencies over which the variable frequency generator is to be calibrated, a zero beat detector 3 which produces control impulses indicative of frequency coincidence between the units 1 and 2, and a recording system 4. The present invention resides in a particular arrangement and combination of elements which constitute the recording system 4; however, in order to clearly describe the invention, a brief description of the calibrating system will first be given.

As mentioned above, the purpose of the calibrating system to which the present invention is particularly applicable is to calibrate, rapidly and accurately, variable frequency generators such as indicated at 1 in Fig. 1. The variable frequency generator is capable of being tuned over a certain range of frequencies. The standard signal generator 2 generates signals having frequencies extending over the desired frequency range. For example, this signal generator may generate signals having frequencies extending over the range of 125 k. c. to 250 k. c. and these signals may be spaced apart in frequency by 1 k. c. In operation of the system, the zero beat detector is automatically tuned successively to the frequencies throughout the said range, and at the same time the variable frequency generator 1 is automatically adjusted throughout its tuning range. Thus, the zero beat detector effectively selects the signals from source 2, one by one. Moreover, it effectively compares the instantaneous frequency of the variable frequency generator 1 with that of each of the successive signals from source 2. Each time the frequency of the generator 1 coincides with the frequency selected from source 2, the zero beat detector produces a control impulse which actuates the recording system 4. The successive recordings constitute the desired calibrations.

As shown in Fig. 2, the tuning condensers 5 of the zero beat detector 3 are driven from a shaft 6 through suitable reduction gearing. The shaft 6 is driven by a motor 7. At the same time, the tuning apparatus of the variable frequency generator 1 is likewise driven from shaft 6 through suitable reduction gearing. At the beginning of each calibrating process, the tuning devices of units 1 and 3 are set at the extreme end of the frequency range, and during the calibrating process the tuning devices are continously operated throughout the frequency range until the other limit thereof is reached.

The variable frequency generator 1 has a "units" dial 8 having evenly spaced markings thereon from 0 to 100 and with which there is associated a stationary vernier dial 9. The variable frequency generator also has a "hundreds" dial 10 which moves at a slower rate than does dial 8 and which is directly connected to the tuning device (not visible) of the variable frequency generator. As a specific example, the shaft 6 may rotate approximately 5000 times during the calibrating process; the shaft 11, driving dial 8, may rotate 50 times; and the dial 10 may make one-half revolution. This latter dial may be provided with evenly spaced markings from 0 to 50, each of which corresponds to a complete revolution of the dial 8.

As a specific example, it may be desired to list calibration points every 0.1 k. c. throughout the range of frequencies 125 k. c. to 250 k. c. Recordings may be made every 1 k. c., making a total of 125 recordings, and the intermediate points may be obtained by interpolation.

As previously indicated, the calibrating process is carried out by recording the totalized revolutions of shaft 6 at each instant when the frequency of the variable frequency generator 1 coincides with a particular frequency of the standard signal source 2. In order to perform the calibrating process very rapidly, the shaft 6 may be rotated at a speed of the order of 1000 revolutions per minute, or higher; and in order to achieve the desired degree of accuracy, it is desired to record the totalized revolutions of the shaft within one-tenth of a revolution. This recording operation has presented a substantial problem which the present invention has solved by means of the apparatus now to be described. It will be understood, then, that the present invention is directed specifically to the recording of the totalized revolutions of the shaft 6 and is not concerned with the details of the system briefly described above.

As indicated in Fig. 2, the arrangement or combination of elements provided by this invention comprises a totalizing switch 12 which is driven by shaft 6 through a suitable coupling 13, a number storage bank 14 electrically associated with and controlled by the totalizing switch, and a suitable recorder 15 associated with the number storage bank and adapted to record the successive numbers which are temporarily stored by the device 14. The specific structure of a preferred form of the apparatus comprising these several elements will now be described.

In Fig. 3, there is illustrated schematically a preferred form of the totalizing switch 12. This switch device comprises a plurality of selector switches, each of which includes ten stationary contacts 16, which are numbered in Fig. 3 from "0" to "9," and a rotating contact arm 17 adapted to successively engage the said contacts. The arms 17 rotate clockwise, as viewed in Fig. 3. As it is desired to record the totalized revolutions of the driving shaft within one-tenth of a revolution, and since the total number of revolutions during a calibrating process will extend into the thousands, the totalizing switch preferably comprises five sections as illustrated. The first section 18 is the "tenths" section, the second section 19 is the "units" section, the third section 20 is the "tens" section, the fourth section 21 is the "hundreds" section, and the fifth section 22 is the "thousands" section. In addition, there is preferably provided a "disconnect switch" 23, the purpose of which will be explained later.

The construction and arrangement of this totalizing switch is such that the positions of the movable arms 17 at any instant are indicative of the totalized revolutions of the driving shaft. Thus, the specific positions of the arms shown in Fig. 3 indicate that the totalized revolutions of the driving shaft is 2494.0. To accomplish the stated end, the rotating arm of the "tenths" section 18 is driven by a shaft 24 which is directly coupled to the shaft 6 (Fig. 2), while each of the other sections of the switch is driven through a suitable stepping gear link from the preceding section in the ratio 1 to 10. Thus, the "units" section 19 is driven from the "tenths" section through a gear link indicated at 25, which causes one-tenth of a revolution of the rotor arm of section 19 for each revolution of the rotor arm of section 18. Sections 20, 21 and 22 are each similarly driven from the preceding section by means of gear links 26, 27 and 28, respectively. The gear links are such that each succeeding section is actuated only when the preceding section reaches a certain point in its rotative cycle, as will be presently seen.

The structure of the totalizing switch 12 is shown in Figs. 4 to 12, inclusive. Referring to Fig. 4, the supporting framework of the switch structure may comprise a metal base 29 on which the various parts are mounted. A pair of vertical metal plates 30 and 31 are mounted on the base as shown and have a plurality of bolts 32 extending between them. Five insulating plates numbered 33 to 37 are supported on the bolts 32 in spaced relation by means of spacing collars 38. Each of these five insulating plates forms a part of one of the five switch sections above mentioned, and each plate serves to support the stationary contacts 16 of the particular switch section. Forwardly of the plate 31 is another insulating plate 39 which is secured directly to base 29 and is also secured to plate 31 through suitable connecting elements 40. An extended boss 41 on plate 31 extends within an opening in plate 39 and these two plates rotatably support the shaft 24 by means of the bearings 43 and 44. The insulating plate 39 also serves as a supporting element for the disconnect switch 23 (Fig. 3) hereinbefore mentioned. As may be seen in Fig. 6, a metal plate 45 is secured to the front of the insulating plate 39 and is apertured at 46 and is also recessed as at 47. A contact arm 48 is carried by shaft 24 and is adapted to engage the metal plate 45. The purpose of the recess 47 is to provide a "dead" or insulating space 49 to interrupt the engagement between the contact arm and the metal plate 45 for a purpose to be described later.

As clearly shown in Fig. 9, a rod 50 is fixedly supported by the rear end plate 30 and has its forward end seated in a recess 51 of shaft 24. A pin 52 secures the rear end portion of rod 50 to a sleeve 53 within which the said end of rod 50 is disposed. The sleeve 53 is seated within apertures of plates 30 and 33 and is secured to a disc 54 which, in turn, is secured to plate 30 by means of screws 55. The rod 50 rotatably supports certain of the rotatable elements of the switch structure as will be presently seen.

The shaft 24, which is coupled to the shaft whose totalized revolutions are to be recorded, carries the contact arm 17 of the "tenths" section 18 of the switch device. The structure by means of which the "units" section is driven from the "tenths" section is illustrated in Figs. 9 to 11, this structure being typical of the gear links which are provided between the successive sections as above mentioned. At its recessed end, shaft 24 carries a member 57 of the character shown in Fig. 12. Member 57 has an extending pin 58 (Fig. 9) which seats in a recess in an enlarged portion of shaft 24 so that the said member rotates with the shaft. As will be seen in Fig. 9, the member 57 is disposed within an opening in plate 37. A special pinion 59 (see Fig. 12), having trunnions 60, is rotatably supported beneath member 57 and in cooperative relation therewith by means of plates 61 secured to the opposite faces of plate 37. Referring specifically to Fig. 12, it will be noted that member 57 comprises a disc portion 62, having a notch or recess 63 therein, and a pair of adjacent gear teeth 64. The notch 63 is aligned with the space between teeth 64. The pinion 59 has alternately disposed short and long teeth 65 and 66, the long teeth being adjacent the disc portion 62. The pinion cooperates with member 57 in a manner which will be presently described.

A sleeve member 67 (Fig. 9) carries the contact arm 17 of the next section, i. e., the "units" section, and this member has an integral gear 68 which meshes with all of the teeth of pinion 59, as shown in Fig. 10.

During most of a complete revolution of the shaft 24, the pinion 59 is positioned as shown in Fig. 11 and is maintained stationary by disc 62 whose peripheral edge prevents movement of the long teeth 66. At such time one of the short teeth 65 projects into the path of teeth 64. Once during each revolution of shaft 24, as the "tenths" arm is passing from "9" to "0" (Fig. 3), the two teeth 64 engage the projecting short tooth and an adjacent long tooth 66 of the pinion 59, while the notch 63 engages the same long tooth to permit limited rotation of the pinion 59 sufficient to move the "units" arm through one-tenth of a revolution, or in other words, from one contact to the next contact. When the long pinion tooth leaves the notch 63, the rotation of the pinion is interrupted and the pinion is again maintained stationary by the disc 62 until the teeth 64 engage the next long tooth of pinion 59. Thus, the disc 62 permits rotation of the pinion by the teeth 64 during one-tenth of each rotative cycle, and the said disc prevents the pinion from rotating during the remainder of each cycle. The rotation of the pinion operates the gear 68 sufficiently to rotate the sleeve 67 through one-tenth of a revolution. The teeth of gear 68 are similar in all respects to the teeth 64, so that the pinion 59 rotates member 67 in unison with member 57.

As stated above, the other sections of the totalizing switch are operated by similar structures. However, the element corresponding to member 57 in the succeeding sections is preferably formed as an integral part of the rotative sleeve. Thus, sleeve 67 has an integral portion 69 which is similar to member 57 and which functions in the same manner to drive the succeeding switch section during one-tenth of each revolution of the sleeve 67. Each of the switch sections, other than the "tenths" section, is moved only when its predecessor moves from the "9" contact to the "0" contact. Since all of the switch sections are similar, and the operation of each stems from the "tenths" section, all movements of the subsequent sections occur only during the interval when the "tenths" rotor arm is moved between its "9" and "0" contacts.

As previously mentioned, the stationary contacts of the successive switch sections are carried by the insulating plates 33 to 37, and as shown in Figs. 5 and 7, each of these plates is provided with connection terminals 70 to which the stationary contacts are connected by means of conductors or wires designated generally by reference character 71. Also, as will be seen in Figs. 4 and 9, each of the contact arms 17 is preferably provided with an associated stop arm 72 which supports the associated contact arm when it is not in engagement with one of the stationary contacts.

Referring now to Fig. 13, the above-described totalizing switch device is included in an electrical circuit with certain other elements, as illustrated. Each of the selector switches comprising the totalizing switch has associated with it a plurality of triggerable electrical devices which may take the form of gas-filled discharge tubes, such as thyratrons, or cold cathode, three element discharge tubes. Thus, in Fig. 13, the "tenths" section 18 of the totalizing switch is shown in detailed association with a number of such devices. In the illustration, to conserve space, there are shown only four tubes of the above mentioned character numbered 73 to 76, respectively, but actually there are ten such tubes associated with the "tenths" section of the totalizing switch, one tube for each stationary contact of the selector switch. The selector switch 18 and the associated tubes may be considered as comprising a unit as indicated by the broken line rectangle 77.

Each of the succeeding sections of the totalizing switch is similarly arranged in association with a plurality of tubes of the same character. Thus, the rectangles 78, 79, 80 and 81 correspond to the uppermost rectangle 77 and each is intended to represent a succeeding section of the totalizing switch and the associated tubes. In each instance, for simplicity, a single tube is shown in association with the selector switch.

The tubes employed in association with the totalizing switch constitute the "number storage bank" 14 (Fig. 2) previously mentioned. These tubes are preferably cold cathode tubes, and each has a cathode 82, a main anode 83, and a starting anode 84. It is characteristic of such a tube that it will not become conductive, even though the normal operating potential is applied to its main anode, until a certain starting potential is applied to its starting anode; and furthermore, once the tube becomes conductive, it remains so until its cathode-anode circuit is opened. It is also characteristic of such a tube that it emits light during its operation. These characteristics of the particular tube employed may be utilized to accomplish the purposes of the present invention, as will be presently seen.

A voltage source 85 supplies the necessary potentials for the various tubes. A circuit-closing device 86 initiates operation of the circuit in response to a control impulse. While the device 86 is shown for purposes of illustration as an electromechanical relay, it may take the form of an electronic device such as a thyratron, particularly if shaft 6 is rotated at such a high speed as to make very rapid action desirable. When the relay 86 is energized, the positive terminal of source 85 is connected to the main anodes of the various tubes through conductor 87 as will be readily apparent. The cathodes of the various tubes are permanently connected through elements 88 and 89 to the negative side of source 85. The various cathode resistors 88 of each group of tubes are connected together and to the coil of a relay as at 89, which in turn is connected to the negative terminal of source 85. The relays associated with the five units 77 to 81 are numbered from 89 to 93, respectively. The purpose of these relays will be explained presently.

A starting potential for the various tubes is derived from source 85 through a voltage divider comprising resistors 94 and 95, which are serially connected across the said source through the disconnect switch 23. One end of resistor 94 is connected to the stationary contact plate 45 of the disconnect switch 23 by means of conductor 96. Resistor 95 is connected between the rotor arm 48 and ground. In operation, as will presently be seen, the starting potential is applied to the starting anode of a selected tube in each group through the associated selector switches. To this end, the starting anodes of the various tubes are connected respectively to the stationary contacts of the associated selector switches by means of conductors designated generally by reference character 97. In each instance the circuit for applying the starting potential to the selected tubes is completed through the disconnect switch 23, the shaft 24, and the rotating metallic parts of the selector switch sections. Thus, if the relay 86 were closed at the instant depicted in Fig. 13, the starting potential would be applied to tube 76, and would also be applied to a selected tube of each of the other groups, depending upon the instantaneous positions of the contact arms of the succeeding selector switches. The actuation of the selected tubes (one of each group) effectively stores the number represented by the positions of the various sections of the totalizing switch at the instant of operation. As previously mentioned, the stored number is recorded by means of apparatus presently to be described.

The reason for providing the disconnect switch 23 may now be seen. It will be recalled that during the one-tenth of a revolution of the driving shaft when the "tenths" arm passes from "9" to "0," two or more of the switch arms move between adjacent contacts, but this does not happen at any other time. Owing to inevitable mechanical imperfections and backlash, it is conceivable that if relay 86 closed at the instant shaft 6 was at a number, say 4357.95, then the "7" might be stored in the "units" section, and the next number to appear, namely "0," would be stored in the "tenths" section, thereby causing the stored number to be 4357.0, whereas the correct number which should have been stored is 4358.0. The purpose of the disconnect switch 23 is to prevent such error. The rotating arm of this switch is directly coupled mechanically to the "tenths" rotor arm and bears a fixed angular relation thereto. The "dead" space 49 is such that switch 23 opens just before the "tenths" rotor arm leaves contact "9" and the said switch closes just after the said arm reaches contact "0." Since the disconnect switch 23 is serially included in the circuit controlled by the selector switches, the latter are rendered electrically inoperative during the "throw-over" period, thus eliminating any possibility of error if a control pulse happened to occur during that period.

Relay 86 is momentarily energized by a control impulse received from the zero beat detector previously mentioned, and this relay is provided with lock-in contacts 98 in addition to its main contacts 99. When the relay is momentarily energized, a lock-in circuit is completed which includes an energizing source 100. One of the lock-in contacts is carried on a pivoted arm 101 which is connected through a link 102 to a second pivoted arm 103. The purpose of this arrangement will be explained later.

The relays 89 to 93, heretofore mentioned, jointly control an energizing circuit for a solenoid 104 which forms part of the recording mechanism presently to be described. To this end, the contacts of the said relays, bearing the numbers 105 to 109, are serially included in an energizing circuit for the solenoid 104 including the source 100. Therefore, when all of the said relays are energized, the solenoid 104 is energized.

The armature 110 of solenoid 104 is connected through a crank arm 111 to a rotatable shaft 112. At its other end the armature 110 carries a pawl 113 which engages a ratchet member 114. The functions of the shaft 112 and ratchet member 114 will be described later. The armature 110 also carries a projecting finger 115 having an inclined cam portion 116 which is adapted to engage a roller 117 on the arm 103. The entire armature assembly is urged toward the right, as viewed in Fig. 13, and is normally maintained in its right-hand position, by means of a spring 118.

Referring now to Figs. 14 and 15, all of the tubes (73, 74, etc.) are arranged in a bank which is generally designated by reference character 119. In Fig. 14 the tubes are represented as squares. Each horizontal row represents the tubes of one group. The tubes are disposed within an enclosure 120 with which there is associated a camera 121. The purpose of this arrangement is to photographically record the totalized revolutions of the shaft 6 (Fig. 2) by making a photographic record of the tubes which are actuated each time a recording operation is instituted by a control impulse received by the relay 86 from the zero beat detector. A lens 122 is adapted to focus the light rays from the actuated tubes onto a normally stationary film 123 within the camera 121. The film is movably supported by suitable pulleys or rollers represented generally at 124, and it passes around a driving roller 125 mounted on a shaft 126, which carries the ratchet member 114. A shutter member 127, having a window 128 therein, is carried by a rotatable shaft 129. The shutter 127 has a shoulder 130 which cooperates with a stationary stop 131. The shutter is normally in the position shown with its shoulder 130 against the stop 131. It will be noted that the window 128 is normally out of line with the lens 122 and the film 123. The shaft 129 is connected through suitable gearing 132 to shaft 112.

The operation of the complete totalizing and recording system will now be described with particular reference to Figs. 13 to 15. Normally, the relay 86 is deenergized and the system is inoperative. At such time, one of the frames of the film 123 is in a position to receive the light rays from the tubes but the latter are inoperative and therefore emit substantially no light. Moreover, the shutter 127 is in its normal position, shown in Fig. 14. Of course it will be realized that the totalizing switch is being continuously driven by the shaft 6, whose totalized revolutions are to be recorded at the desired instants.

When a controlling impulse is received by relay 86 from the zero beat detector, as above described, the relay is momentarily energized and locks itself in through its holding contacts 98. The closure of relay contacts 99 applies an operating potential to the main anodes of all of the tubes (73, 74, etc.) by way of conductor 87, but the tubes remain deionized until a suitable potential is applied to their starting anodes. The voltage divider 94—95 applies a starting potential to one tube of each group, depending upon the position of the associated selector switch at that instant. By way of example, the voltage source 85 may supply 185 volts and the voltage divider 94—95 may supply 100 volts to the starting anode of each selected tube. The selected tube of each group is thus ionized and commences to conduct current, with the result that its anode-cathode potential is reduced to about 70 volts. The resistance of each of the resistors 88 is made equal to the resistance of the associated coils of relays 89, 90, etc., and, therefore, approximately 57.5 volts will appear across each relay coil, which biases the cathode and starter anodes of the non-selected tubes positive by that amount. Further rotation of the totalizing switch will therefore apply about 42.5 volts between the starter anode and cathode of each subsequently selected tube, but this voltage is insufficient to ionize those tubes. Thus, after relay contacts 99 are closed, the first tube of each group to be selected becomes ionized while the other tubes remain deionized even though the associated selector switch successively closes the circuits to their starting anodes. The selected tubes remain ionized until the relay contacts 99 are opened. Thus, the total number of revolutions through which the rapidly rotating shaft 6 has revolved at a given instant is stored in the number storage bank constituted by the various tubes.

The energization of the five relays numbered from 89 to 93 by the operation of one tube of each group effects energization of the solenoid 104 as previously indicated. Consequently, the armature 110 is moved toward the left, rotating the shaft 112 an amount sufficient to cause clockwise rotation of shutter 127, as viewed in Fig. 14, until the window 128 is aligned with the lens 122 and film 123. The light rays from the actuated tubes are thus permitted to impinge on the film 123 which records them as spots. This recording operation takes place before the finger 115 (Fig. 13) engages roller 117. As the armature 110 nears the left-hand end of its stroke, the cam surface 116 engages roller 117 and deflects arm 103 upward or counter-clockwise about its pivot, thereby actuating lever 101 in the same manner. Consequently, the holding circuit of relay 86 is broken and the relay contacts 99 are opened, thereby causing deionization of the activated tubes. As a result, the relays 89 to 93 are deenergized, thereby deenergizing the solenoid 104.

Immediately following the deenergization of the solenoid 104, the spring 118 moves the armature 110 back to its right-hand position, causing sufficient clockwise rotation of ratchet member 114 to move the film 123 sufficiently to bring the next frame thereof into alignment with the lens 122. At the same time, the shutter 127 is returned to its normal position against the stop 131, but as the tubes (73 to 76, etc.) have already been deenergized by contacts 99, no false record is made.

The apparatus is now in its inoperative condition and awaits the next control impulse. Each time a control impulse is received, the above described operation takes place, but it will be understood that different ones of the tubes will be activated according to the positions of the selector switches at each successive instant of operation.

The positions of the recorded spots in each frame of the film indicate the totalized revolutions of the shaft 6 corresponding to a particular frequency of the frequency meter 1. The numbers thus recorded are listed as calibrations of the frequency meter dial. If desired, the film may be suitably marked to facilitate the reading of the recorded numbers.

Mention has been made previously of the possible use of an electronic device, such as a thyratron, in place of relay 86. In such case, the plate circuit of the thyratron could be opened by a switch actuated by rod 102 and lever 103.

In a particular embodiment employing voltages as above mentioned, the principal elements of the system were as follows:

Tubes 73, 74, etc., were of the type designated 0A4-G.

Each of the resistances constituted by the coils of relays 89 to 93 had a value of 3000 ohms.

Each of the cathode resistors 88 likewise had a value of 3000 ohms.

The resistor 94 had a value of 10,000 ohms.

The resistor 95 had a value of 12,000 ohms.

The series resistor connected to each of the starting anodes of the tubes had a value of 100,000 ohms.

The other resistor connected to each of the starting anode circuits had a value of 1 megohm.

From the foregoing description, it will be seen that the present invention has provided a novel arrangement or combination of elements for recording, rapidly and accurately, the totalized revolutions of a rapidly rotating shaft. By means of such system, it has been found that the recordings can be made to the nearest tenth of a revolution at speeds considerably above 1000 revolutions per minute. It will be understood, of course, that the invention is not limited to the specific apparatus illustrated but is capable of various modifications. For example, recording devices other than that specifically shown might be employed in conjunction with the totalizing switch and the number storage bank.

I claim:

1. In an apparatus for accurately recording the total revolutions of a rotating shaft at a given instant, a rotary switch device operable by said shaft, said switch device comprising a plurality of selector switches adapted to register the number of revolutions of the shaft, a plurality of normally inoperative gas-filled discharge tubes associated with each of said selector switches, means including said switches for selectively actuating certain ones of said tubes depending upon the positions of said selector switches at the instant of actuation, and means responsive to the operation of the actuated tubes for making a record indicative of the total shaft revolutions at said instant.

2. In an apparatus for accurately recording the total revolutions of a rotating shaft at a given instant, a multi-section switch device operated by said shaft, each section of said switch device comprising a predetermined number of stationary contacts and a movable contact arm adapted to engage said contacts successively, said switch device further comprising means for establishing a multiple relationship between the movements of the successive sections, a plurality of normally inoperative electrical devices associated with each of said switch sections, said devices being operated by the application thereto of an operating potential and a starting potential, means for applying an operating potential to all of said devices at a given instant, means controlled by said switch sections for applying a starting potential to certain ones of said electrical devices depending upon the positions of the switch arms at said instant, and means responsive to the operation of the selected devices for making a record indicative of the total shaft revolutions at said instant.

3. In an apparatus for accurately recording at a given instant the total revolutions of a shaft rotating at substantial speed, a first rotary selector switch operable by said shaft and having ten effective positions so that each position represents one-tenth of a revolution of said shaft, a plurality of succeeding selector switches of the same character, means for operating each succeeding selector switch through one-tenth of a revolution when the preceding switch reaches a certain point in its rotative cycle, whereby the positions of said selector switches at any instant are indicative of the total revolutions of said shaft within one-tenth of a revolution, means connected to said switches for retentively registering the positions of said switches at a given instant, thereby to retentively register the number of revolutions of the shaft at that instant, and means for automatically making a record corresponding to the registered number.

4. In an apparatus for accurately recording at a given instant the total revolutions of a shaft rotating at a substantial speed, a first rotary selector switch operable by said shaft and having ten effective positions so that each position represents one-tenth of a revolution of said shaft, a plurality of succeeding selector switches of the same character, means for operating each succeeding selector switch through one-tenth of a revolution when the preceding switch reaches a certain point in its rotative cycle, whereby the positions of said selector switches at any instant are indicative of the total revolutions of said shaft within one-tenth of a revolution, a plurality of normally inoperative electrical devices associated with each of said switches for retentively registering the positions of said switches at a given instant, thereby to retentively register the number of revolutions of the shaft at that instant, means responsive to a control impulse for effecting selective actuation of said devices according to the positions of said switches, and means responsive to the actuation of the selected devices for making a record which is indicative of the total revolutions of said shaft at the time of said control impulse.

5. In an apparatus for accurately totalizing the revolutions of a rotating shaft, a plurality of electrically-operable devices the selective energization of which at a given instant is indicative of the total revolutions of the shaft, a rotary selector switch having a rotor arm driven by said shaft and a plurality of stationary contacts engageable by said arm, a plurality of other selector switches each having a rotor arm and stationary contacts, means responsive to movement of said first rotor arm between a certain pair of the associated contacts for moving one or more of said other rotor arms between adjacent contacts, means connecting said devices respectively to the stationary contacts of said switches, an energizing circuit connection for said devices extending to the rotor arms of said switches, whereby said connection is extended to certain ones of said devices at a given instant, and a disconnect switch operable by said shaft and adapted to prevent completion of said circuit connection during the interval when two or more of the rotor arms are moving.

6. An apparatus for accurately recording at a given instant the total revolutions of a shaft rotating at substantial speed, comprising a rotary switch device operated by said shaft, said switch device including a plurality of selector switches adapted to register the number of revolutions of the shaft, means including a plurality of electrical devices connected to each of said selector switches for retentively registering the positions of said switches at a given instant, thereby to retentively register the number of revolutions of the shaft at that instant, and means responsive to the operation of said last-named means for making a record corresponding to the registered number.

7. An apparatus for accurately recording at a given instant the total revolutions of a shaft rotating at substantial speed, comprising a rotary switch device operated by said shaft, said switch device including a plurality of selector switches adapted to register the number of revolutions of the shaft, means including a plurality of light-emitting gas-filled discharge tubes connected to each of said selector switches for retentively registering the positions of said switches at a given instant, thereby to retentively register the number of revolutions of the shaft at that instant, said tubes being arranged in a bank in predetermined order, and means responsive to operation of said last-named means for making a photographic record of the actuated tubes, thereby to make a record corresponding to the registered number.

8. An apparatus for accurately recording at a given instant the total revolutions of a shaft rotating at substantial speed, comprising a rotary switch device operated by said shaft, said switch device including a plurality of selector switches adapted to register the number of revolutions of the shaft, a plurality of electric discharge tubes characterized in that each tube requires the application thereto of an operating potential and a starting potential, and once started it operates until the operating potential is removed, means for applying an operating potential to all of said tubes at a given instant, means controlled by said switches for applying a starting potential to certain ones of said tubes depending upon the positions of said switches at said instant, whereby said tubes retentively register the number of revolutions of the shaft at said instant, and means responsive to the operation of the selected tubes for making a record corresponding to the registered number.

DAVID E. SUNSTEIN.

REFERENCES CITED

The following references are of record in the file of this patent:

UNITED STATES PATENTS

| Number | Name | Date |
|---|---|---|
| 1,446,552 | Dunn | Feb. 27, 1923 |
| 1,982,882 | Rhodes | Dec. 4, 1934 |
| 2,091,768 | Noble | Aug. 31, 1937 |
| 2,098,227 | Chauveau | Nov. 9, 1937 |
| 2,150,240 | Nichols | Mar. 14, 1939 |
| 2,206,827 | Prince | July 2, 1940 |
| 2,313,088 | Potts | Mar. 9, 1943 |
| 2,344,497 | Cooney | Mar. 21, 1944 |

FOREIGN PATENTS

| Number | Country | Date |
|---|---|---|
| 519,963 | Germany | Mar. 6, 1931 |